(12) United States Patent
Fujii et al.

(10) Patent No.: US 12,048,970 B2
(45) Date of Patent: Jul. 30, 2024

(54) LASER PROCESSING APPARATUS

(71) Applicant: Mitsubishi Electric Corporation, Tokyo (JP)

(72) Inventors: Kenta Fujii, Tokyo (JP); Motoaki Nishiwaki, Tokyo (JP); Nobuaki Tanaka, Tokyo (JP); Masaki Seguchi, Tokyo (JP); Kyohei Ishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 768 days.

(21) Appl. No.: 17/048,100

(22) PCT Filed: Apr. 26, 2019

(86) PCT No.: PCT/JP2019/017981
§ 371 (c)(1),
(2) Date: Oct. 16, 2020

(87) PCT Pub. No.: WO2019/244484
PCT Pub. Date: Dec. 26, 2019

(65) Prior Publication Data
US 2021/0162544 A1 Jun. 3, 2021

(30) Foreign Application Priority Data
Jun. 22, 2018 (JP) .................. 2018-119259

(51) Int. Cl.
*B23K 26/38* (2014.01)
*B23K 26/064* (2014.01)

(52) U.S. Cl.
CPC ............ *B23K 26/38* (2013.01); *B23K 26/064* (2015.10)

(58) Field of Classification Search
None
See application file for complete search history.

(56) References Cited

U.S. PATENT DOCUMENTS

2004/0032597 A1* 2/2004 Esmiller ............... G01B 11/04
356/636
2010/0086003 A1* 4/2010 Pfitzner et al. ........ G01N 25/72
374/5
(Continued)

FOREIGN PATENT DOCUMENTS

JP 11-85210 A 3/1999
JP 2003334679 A * 11/2003 ............. B23K 26/00
(Continued)

OTHER PUBLICATIONS

Machine translation of WO 2016181695 A1 performed on Aug. 8, 2023, Miyagi (Year: 2016).*

(Continued)

Primary Examiner — Dana Ross
Assistant Examiner — Kevin Guanhua Wen
(74) Attorney, Agent, or Firm — XSENSUS LLP

(57) ABSTRACT

A laser processing apparatus includes a laser oscillator; a processing head; a driver that controls a relative positional relationship between a workpiece and the processing head; control circuitry that controls the laser oscillator and the driver in order for the laser beam to scan a processing path on the workpiece; detection circuitry that observes a state of the workpiece being processed and outputs a result of observation as a time series signal; processed state observation circuitry that obtains evaluation information including a determination result that indicates whether a processed state of the workpiece is satisfactory or defective by evaluating the processed state of the workpiece on the basis of the time series signal for each of a plurality of sections obtained by dividing the processing path; and estimation circuitry that estimates a cause of a defect on the basis of the evaluation information of two or more of the sections.

8 Claims, 5 Drawing Sheets

(56) References Cited

U.S. PATENT DOCUMENTS

| | | |
|---|---|---|
| 2011/0278277 A1 | 11/2011 | Stork Genannt Wersborg |
| 2011/0284512 A1 | 11/2011 | Stork Genannt Wersborg |
| 2017/0270434 A1 | 9/2017 | Takigawa et al. |

FOREIGN PATENT DOCUMENTS

| | | | | |
|---|---|---|---|---|
| JP | 2012-509189 A | | 4/2012 | |
| JP | 2012-236267 A | | 12/2012 | |
| JP | 2017-164801 A | | 9/2017 | |
| JP | 2017535431 A | * | 11/2017 | ........... B23K 31/125 |
| WO | WO 9731748 A1 | * | 9/1997 | ............. B23K 26/00 |
| WO | WO 2014155188 A1 | * | 10/2014 | ............. B23K 26/03 |
| WO | WO 2016181695 A1 | * | 11/2016 | ........... B23K 26/032 |
| WO | WO 2017087451 A1 | * | 5/2017 | ............... G06T 7/00 |

OTHER PUBLICATIONS

Machine translation of JP 2003334679 A performed on Aug. 8, 2023, Masukata et al. (Year: 2003).*
Machine translation of JP 2017535431 A performed on Dec. 28, 2023, Daniel et al. (Year: 2017).*
International Search Report and Written Opinion mailed on Jul. 9, 2019 for PCT/JP2019/017981 filed on Apr. 26, 2019, 7 pages including English Translation of the International Search Report.

* cited by examiner

| SECTION | EVALUATION | DETERMINATION |
|---|---|---|
| SECTION A | 0.79 | SATISFACTORY |
| SECTION B | 0.85 | SATISFACTORY |
| SECTION C | 0.82 | SATISFACTORY |
| SECTION D | 0.28 | DEFECTIVE |

LASER PROCESSING APPARATUS

CROSS-REFERENCE TO RELATED APPLICATIONS

The present application is based on PCT filing PCT/JP2019/017981, Apr. 26, 2019, which claims priority to JP 2018-119259, filed Jun. 22, 2018, the entire contents of each are incorporated herein by reference.

FIELD

The present invention relates to a laser processing apparatus that processes a workpiece with a laser beam.

BACKGROUND

Laser processing is a processing method that focuses a laser beam and irradiates a workpiece with the laser beam to change the shape of the workpiece by, for example, melting and evaporating the workpiece. In laser processing, various processing defects occur depending on a state of a laser processing apparatus and processing conditions. Specific examples of the processing defects include dross that is a product of oxidation adhering to a lower surface of a workpiece during processing, a flaw that is unevenness formed on a surface being processed, and the like.

The processing defects occur due to various causes such as a state of the workpiece, the processing conditions, and poor maintenance of a machine. The state of the workpiece that can cause the processing defects includes temperature, impurities contained in the workpiece, a surface condition, rust, and the like. The processing conditions that can cause the processing defects include laser output, processing speed, gas pressure, and the like. The poor maintenance of a machine that can cause the processing defects includes nozzle damage, nozzle misalignment, mechanical vibration, and optical system contamination.

A delay in the detection of occurrence of the processing defect results in generating a large number of defective products and decreases the production efficiency. Meanwhile, it is difficult for an operator to detect the occurrence of the processing defect during processing, and in many cases, the processing defect is detected only after the workpiece is visually checked upon completion of processing. Therefore, a method of detecting the processing defect independently of a human and a method of adjusting the processing conditions according to the processing defect have been developed.

Patent Literature 1 discloses a machine learning apparatus including: a state quantity observation unit that observes a state quantity of a laser processing system; an operation result acquisition unit that acquires a result of processing by the laser processing system; and a learning unit that receives output from the state quantity observation unit and output from the operation result acquisition unit to learn laser processing condition data in association with the state quantity and the result of processing of the laser processing system.

CITATION LIST

Patent Literature

Patent Literature 1: Japanese Patent Application Laid-open No. 2017-164801

SUMMARY

Technical Problem

However, the conventional technique described above corrects processing conditions by monitoring and classifying a processed state and by using the state quantity during processing but does not pay attention to a change in the processed state, thereby finding it difficult to estimate a cause of occurrence of a processing defect and failing to properly maintain a machine or adjust the processing conditions according to the cause of occurrence of the processing defect.

The present invention has been made in view of the above, and an object of the present invention is to provide a laser processing apparatus capable of estimating a cause of a defect that occurs during processing.

Solution to Problem

In order to solve the above problem and achieve the object, a laser processing apparatus according to the present invention includes: a laser oscillator that emits a laser beam; a processing head including an optical system that focuses the laser beam onto a workpiece; a drive unit that controls a relative positional relationship between the workpiece and the processing head; a control device that controls the laser oscillator and the drive unit in order for the laser beam to scan a processing path on the workpiece according to a set processing condition; and a detection unit that observes a state of the workpiece being processed and outputs a result of observation as a time series signal. The laser processing apparatus according to the present invention further includes: a processed state observation unit that obtains evaluation information including a determination result that indicates whether a processed state of the workpiece is satisfactory or defective by evaluating the processed state of the workpiece on the basis of the time series signal for each of a plurality of sections obtained by dividing the processing path; and an estimation unit that estimates a cause of a defect on the basis of the evaluation information of two or more of the sections including the section for which the determination result indicates the defect.

Advantageous Effects of Invention

The present invention can provide the laser processing apparatus capable of estimating a cause of a defect that occurs during processing.

DESCRIPTION OF EMBODIMENTS

A laser processing apparatus according to embodiments of the present invention will now be described in detail with reference to the drawings. Note that the present invention is not limited to the embodiments.

First Embodiment

Figure 1:
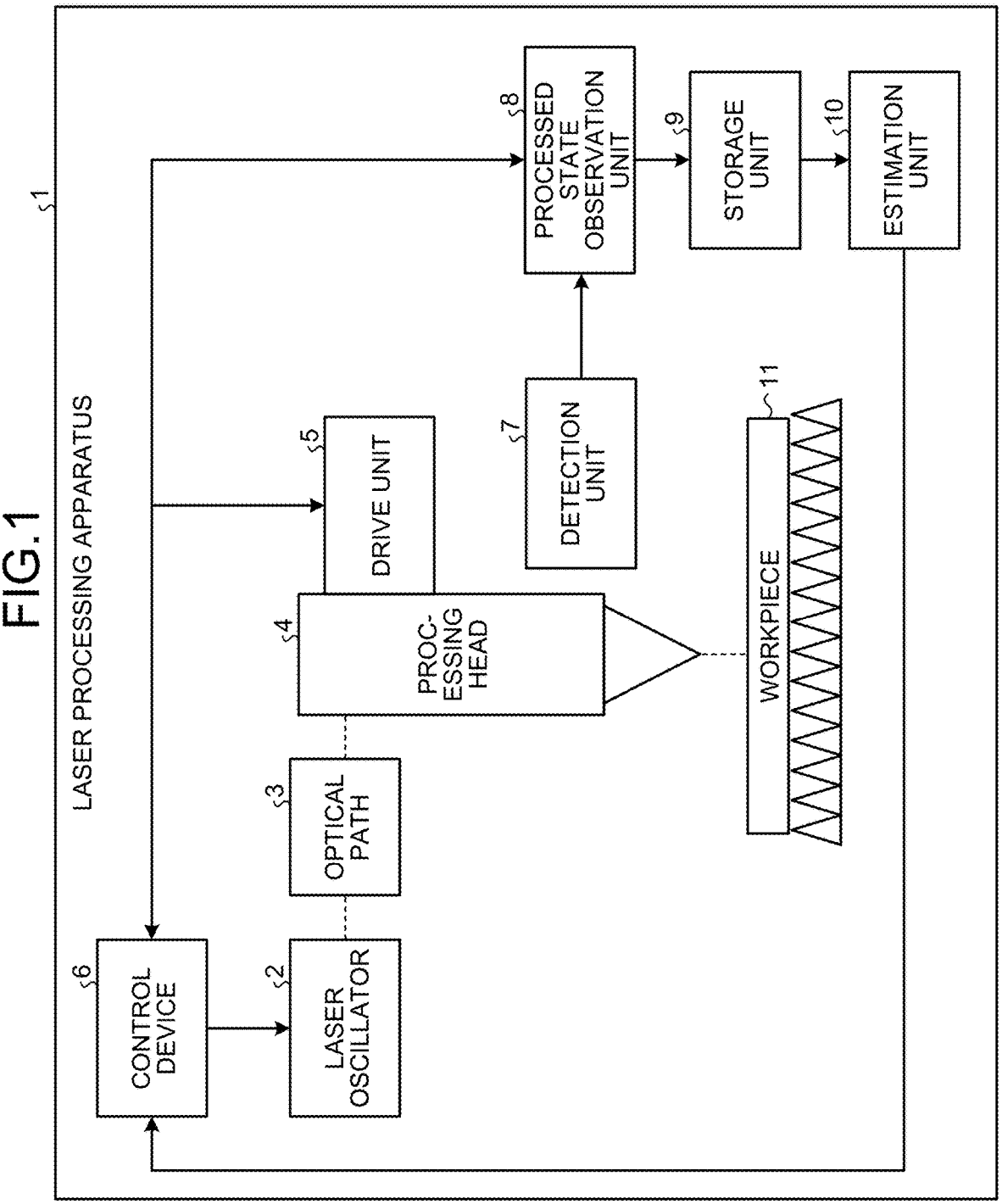
FIG. 1 is a diagram illustrating the configuration of a laser processing apparatus according to a first embodiment of the present invention.

FIG. 1 is a diagram illustrating the configuration of a laser processing apparatus 1 according to a first embodiment of the present invention. The laser processing apparatus 1 includes a laser oscillator 2, an optical path 3, a processing head 4, a drive unit 5, a control device 6, a detection unit 7, a processed state observation unit 8, a storage unit 9, and an estimation unit 10. Note that a dotted line illustrated in FIG. 1 represents a laser beam. Also, the storage unit 9 may be included in any of the control device 6, the processed state observation unit 8, and the estimation unit 10. The laser processing apparatus 1 includes a display unit (not shown), which may be a part of the control device 6.

The laser oscillator 2 oscillates and emits a laser beam. The laser beam emitted from the laser oscillator 2 is supplied to the processing head 4 via the optical path 3. The processing head 4 includes an optical system that focuses the laser beam onto a workpiece 11. The drive unit 5 is a servo controller including at least a set of motor and position sensor, and can perform control to change a relative positional relationship between the processing head 4 and the workpiece 11. The processing head 4 irradiates the workpiece 11 with the laser beam supplied.

The control device 6 controls the laser oscillator 2 and the drive unit 5 such that the laser beam scans a processing path on the workpiece 11 according to set processing conditions.

The detection unit 7 is a sensor for observing a state of the workpiece 11 being processed, and outputs a result of observation as a time series signal. The detection unit 7 may further observe a state of the laser processing apparatus 1 during processing and output a result of observation as a time series signal.

On the basis of the time series signal acquired from the detection unit 7, the processed state observation unit 8 evaluates a processed state of the workpiece 11 and obtains evaluation information in each of a plurality of sections that divides the processing path on the workpiece 11. The evaluation information includes a determination result indicating whether the processed state of the workpiece 11 is satisfactory or defective.

The storage unit 9 stores the evaluation information of the workpiece 11 evaluated by the processed state observation unit 8.

When the determination result on the workpiece 11 indicates a defect, the estimation unit 10 estimates a cause of the defect on the basis of evaluation values of the workpiece 11 in two or more of the sections including the section determined to have the defect, the evaluation values being stored in the storage unit 9.

The type of the laser oscillator 2 is not limited. The laser oscillator 2 includes a fiber laser oscillator, for example, but may be a carbon dioxide laser or a solid-state laser using a YAG crystal or the like as an excitable medium. Alternatively, the laser oscillator 2 may be a direct diode laser using light of a laser diode as it is or the like.

The optical path 3 is a path for transmitting the laser beam output from the laser oscillator 2 to the processing head 4, and may be a path for propagating the laser beam in the air or a path for transmitting the laser beam through an optical fiber. The optical path 3 needs to be designed according to the properties of the laser beam.

The processing head 4 has a function of irradiating the workpiece 11 with the laser beam, and preferably includes the optical system for bringing the laser beam into focus near a surface of the workpiece 11. In order to obtain a satisfactory processing result, it is desirable that the processing head 4 further includes a mechanism for spraying processing gas from a nozzle toward the surface of the workpiece 11 being processed.

The drive unit 5 need only have a function of controlling the relative position between the processing head 4 and the workpiece 11. Therefore, the drive unit 5 need only have at least one of a function of moving the processing head 4 and a function of moving the workpiece 11. Moreover, although a specific example of the drive unit 5 is the servo controller including a linear motor and a position sensor, the drive unit may adopt a drive system using a motor and a gear, and may be a control mechanism including a rotary shaft.

The control device 6 controls the laser oscillator 2 and the drive unit 5 such that the laser beam scans the processing path on the workpiece 11 according to the set processing conditions.

Specific examples of the properties of the workpiece 11 included in the above processing conditions include material, thickness, a surface condition, and the like. Moreover, specific examples of the operating conditions of the laser oscillator 2 included in the above processing conditions include laser output intensity, a laser output frequency, a duty ratio of laser output, a mode, a waveform, a wavelength, and the like. Furthermore, specific examples of the conditions of the optical path 3, the processing head 4, and the drive unit 5 included in the above processing conditions include an optical system of the optical path 3, a focusing optical system, a position of the focal point of the laser beam with respect to the workpiece 11, a focusing diameter of the laser, a distance between the workpiece 11 and the processing head 4, a type of processing gas, a pressure of the processing gas, a hole diameter of the nozzle, a type of the nozzle, processing speed, and the like. Furthermore, specific examples of the atmosphere at the time of processing included in the above processing conditions include temperature, humidity, and the like. Note that the processing conditions illustrated here are examples, and the number of items of the processing conditions can be increased or decreased depending on the type, purpose of processing, devices included, and the like of the laser processing apparatus 1.

The detection unit 7 observes a state of the workpiece 11 during processing and measures, as a time series signal, a measured value of a physical quantity such as intensity and wavelength of light generated during processing or sound waves or ultrasonic waves generated during processing.

The detection unit 7 is, for example, a photodiode that measures the intensity of reflected light from the workpiece 11, and outputs the light intensity measured during processing as time series information. Other examples of the detection unit 7 include a charge coupled device (CCD) sensor, a complementary metal oxide semiconductor (CMOS) sensor, a spectrum spectrometer, and an acoustic sensor. The detection unit 7 may be a combination of the above examples. Moreover, when the laser beam is transmitted using the optical fiber, the detection unit 7 may detect the light generated during processing and transmitted through the optical fiber.

Furthermore, although not directly monitoring the state of the workpiece 11, a sensor for observing the state or atmosphere of the laser processing apparatus 1 such as an acceleration sensor, a gyro sensor, a distance sensor, a position sensor, a temperature sensor, a humidity sensor, or the like may be added to the detection unit 7. In order to enable more accurate observation of the processed state of the workpiece 11 and the state of the laser processing apparatus 1, it is better to use a plurality of or multiple types of sensors as the detection unit 7.

In each of the sections dividing the processing path on the workpiece 11, the processed state observation unit 8 evaluates the processed state of the workpiece 11 in the section and obtains the evaluation information on the basis of the time series signal acquired from the detection unit 7 during processing of the section. The processed state observation unit 8 may further use the processing condition used for processing the section when obtaining the evaluation information of the section.

Figures 2, 3:
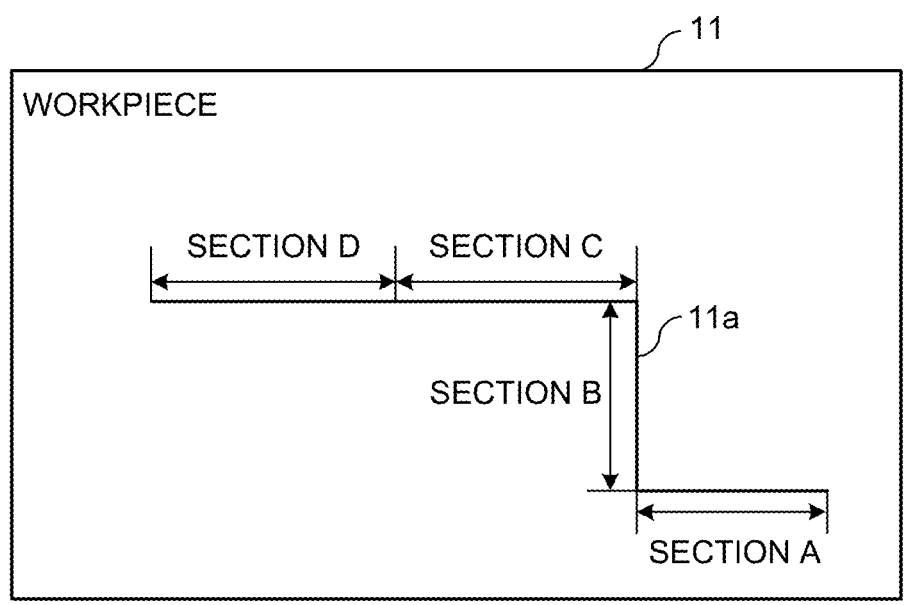
FIG. 2 is a diagram illustrating a processing path designated on a workpiece and divided sections of the processing path according to the first embodiment.
FIG. 3 is a table illustrating an example of evaluation information for each section according to the first embodiment.

FIG. 2 is a diagram illustrating the processing path designated on the workpiece 11 and the divided sections of the processing path according to the first embodiment. FIG. 3 is a table illustrating an example of the evaluation information for each section according to the first embodiment.

A processing path 11a designated by an operator is illustrated on the workpiece 11 in FIG. 2. The processing path 11a is divided into four sections, a section A, a section B, a section C, and a section D, that are processed in the order of the section A, the section B, the section C, and the section D.

Then, during or after processing of each section, the processed state observation unit 8 obtains the evaluation information by evaluating each section on the basis of the time series signal acquired from the detection unit 7 during processing of each section.

The processed state observation unit 8 performs evaluation and determination on each section in order to obtain the evaluation information as illustrated in FIG. 3. An evaluation value indicated under an "evaluation" column in FIG. 3 is a numerical value obtained by evaluating how satisfactory the processed state of the workpiece 11 is. That is, the evaluation value is represented as a value between "0" and "1" by evaluating how certain the section being evaluated is processed satisfactorily. The processed state observation unit 8 sets a threshold to 0.5 and determines that the processing is satisfactory if the evaluation value is higher than or equal to 0.5 or determines that the processing is defective if the evaluation value is less than 0.5, thereby indicating the determination result under a "determination" column. Therefore, the evaluation information obtained by the processed state observation unit 8 includes the evaluation value and the determination result.

The processed state observation unit 8 can calculate the evaluation information of the processed state by analyzing information acquired from the time series signal acquired from the detection unit 7, obtaining feature values representing the characteristics of the processing, and evaluating a set of values of the feature values.

The feature values include, for example, an average and a standard deviation of measured values acquired from the time series signal that is acquired from the detection unit 7 for each section. Then, a reference value is set for each set of the average and the standard deviation, and a degree of defectiveness of a defect occurring in each section is evaluated according to a difference from the reference value. The degree of defectiveness may be defined as a value obtained by subtracting the evaluation value from "1". Note that the method of obtaining the feature values needs to be changed depending on the configuration or type of the detection unit 7.

There are various methods of obtaining the feature values including one that analyzes the time series signals acquired from the detection unit 7 by a method such as a statistical analysis, a frequency analysis, a filter bank analysis, or wavelet transform and determines a set of values acquired by the analysis as the feature values. Note that the method of obtaining the feature values described here is only an example, and the feature values may be obtained using a general analysis method for time series signals.

The processed state observation unit 8 can obtain the evaluation information of the processed state by using a method based on a classifier such as linear discrimination, logistic regression, support vector machine, relevance vector machine, or decision tree for the feature values acquired by analyzing the time series signals acquired from the detection unit 7. In addition, the processed state can be evaluated using a clustering method that uses a K-means algorithm, a Gaussian mixture distribution, a Bernoulli mixture distribution, or the like.

Alternatively, the evaluation information of the processed state may be obtained by directly using the information on the time series signals acquired from the detection unit 7 or by using the feature values acquired by analyzing the time series signals. The processed state can also be evaluated by a method using a neural network such as a neural network, a deep neural network, a recurrent neural network, or the like.

The method of evaluating the processed state described above is an example, and can also include a general classification algorithm, a general clustering method, and a method combining these. Other algorithms may also be used to evaluate the processed state.

Note that in order for the estimation unit 10 to accurately estimate a cause of a defect, it is desired that the processed state observation unit 8 uses the feature values to further classify the defective state of the workpiece 11 and obtain the evaluation information including classification information indicating the classification of the defective state of the workpiece. The classification information can include a value corresponding to at least one of dross, a flaw, upper surface roughness, lower surface roughness, oxide film peeling, and burning. It is further desirable to obtain a degree of defectiveness for each defect in the state thus classified and include it in the evaluation information.

Moreover, the section to be evaluated need only divide the processing path designated on the workpiece 11, and the method of creating the section is not limited. As an example, the section may be created every certain distance on the processing path. As another example, the section may be created by dividing the processing path at regular intervals of processing. Alternatively, the section may be created by dividing the processing path at a point where the direction of progress on the processing path or the shape thereof changes. Yet alternatively, the section may be created by continuously determining the processed state from information acquired from the time series signals acquired from the detection unit 7 during processing and the processing conditions used for processing, and dividing the processing path on the basis of a point where the evaluation information changes. Still alternatively, a method combining the above methods may be used.

The storage unit 9 stores the evaluation information obtained by the processed state observation unit 8. The evaluation information includes the evaluation value and the determination result as described above. At this time, in order to make the estimation unit 10 estimate the cause of the defect more accurately, the storage unit 9 may store the processing conditions for each section, the direction of progress of processing, the position of processing, a result of analysis of the time series signals acquired from the detection unit 7, the shape of processing, or the like in addition to the evaluation information. The estimation unit 10 may further use these pieces of information stored in the storage unit 9 to estimate the cause of the defect. The direction of progress of processing and the position of processing are pieces of information acquired from the control device 6.

The estimation unit 10 estimates the cause of the defect on the basis of the evaluation information of two sections including the section that is determined to have the defect in the determination result by the processed state observation unit 8. Specifically, when the processed state observation unit 8 determines that a section has a defect during processing, the estimation unit 10 estimates a cause of the defect from the evaluation value of the section determined to have the defect and the evaluation value of another section stored in the storage unit 9. That is, the cause of the defect is estimated on the basis of the evaluation value of each of the two sections including the section determined to have the defect. Here, although the evaluation value is used to estimate the cause of the defect, the estimation unit 10 may use another quantity included in the evaluation information as long as the cause of the defect is estimated on the basis of the evaluation information of two sections including the section for which the determination result indicates the defect. The cause of the defect may be estimated by including the feature values in the evaluation information and comparing the feature values of the two sections.

Furthermore, depending on the estimated cause, the estimation unit 10 notifies the control device 6 of the estimated cause of the defect or causes a display unit of the control device 6 to display the cause of the defect so as to present it to an operator. The control device 6 that has received the notification changes the operation of the laser processing apparatus 1 or changes the processing conditions so as to perform maintenance that eliminates the estimated cause.

Hereinafter, a method of estimating the cause of the defect in the estimation unit 10 will be specifically described.

Causes of a defect that occurs during laser processing include the following.
   Contamination of optical system such as protective glass
   Nozzle damage or deformation
   Adhesion of spatter to nozzle
   Misalignment
   Different surface condition or composition of workpiece 11
   High temperature of workpiece 11
   Poor adjustment of processing conditions
   Thermal lens effect The misalignment refers to a state in which the optical axis of the laser beam is off the central axis of the nozzle. The different surface condition or composition of the workpiece 11 refers to a state in which the surface condition or the composition of the workpiece 11 is different from that in a case where satisfactory processing can be performed. The thermal lens effect refers to a state in which heat accumulated in the focusing optical system has caused a change in the optical characteristics.

These causes are classified in advance such that, when a defect has occurred, the cause of the defect can be narrowed down from information acquired by comparing two sections including the section in which the defect has occurred.

As an example, it can be determined whether or not the defect has occurred unexpectedly by comparing the evaluation value of a section immediately before the section determined to have the defect with the evaluation value of the section determined to have the defect. Before explaining this, the causes of the defect are classified into causes that occur unexpectedly and causes that do not occur unexpectedly as follows.
(Causes of Defect that Occur Unexpectedly)
   Contamination of optical system such as protective glass
   Nozzle damage or deformation
   Adhesion of spatter to nozzle
   Different surface condition or composition of workpiece 11
   Poor adjustment of processing conditions
   Misalignment
(Causes of Defect that do not Occur Unexpectedly)
   Thermal lens effect
   High temperature of workpiece 11
   Misalignment The misalignment occurs unexpectedly when the nozzle of the processing head 4 collides with something, or occurs when the nozzle portion is not fixed properly and moves gradually by the vibration associated with repeated acceleration and deceleration of the processing head 4. Therefore, the misalignment can be the cause of a defect that occurs unexpectedly or the cause a defect that does not occur unexpectedly.

As for the poor adjustment of the processing conditions, a defect occurs from the start of processing so that one can determine whether or not the poor adjustment of the processing conditions is the cause of the defect by checking whether or not satisfactory processing is performed in the first section.

It is considered that a defect has occurred in processing by the cause that occurs unexpectedly when the evaluation value of the section determined to have the defect has changed significantly from the evaluation value of a section immediately before the section determined to have the defect. Therefore, the candidates for the cause of the defect estimated by the estimation unit 10 include the contamination of the optical system such as the protective glass, the nozzle damage or deformation, the adhesion of spatter to the nozzle, the different surface condition or composition of the workpiece 11, and the misalignment. Note that whether or not the evaluation value has changed significantly can be determined using a first threshold.

On the other hand, when the evaluation value of the section determined to have the defect has changed by a small amount from the evaluation value of the section immediately before the section determined to have the defect, it is considered that the processed state has gradually become defective and that the defect has occurred in processing by the cause that does not occur unexpectedly. Therefore, the candidates for the cause of the defect estimated by the estimation unit 10 include the thermal lens effect, the high temperature of the workpiece 11, and the misalignment.

Note that whether or not the change in the evaluation value is small can be determined using a second threshold. The second threshold may be the same as or different from the first threshold.

Moreover, when the section determined to have the defect is the first section at the start of processing, the estimation unit 10 can estimate that the poor adjustment of the processing conditions is the cause of the defect.

Figure 4:
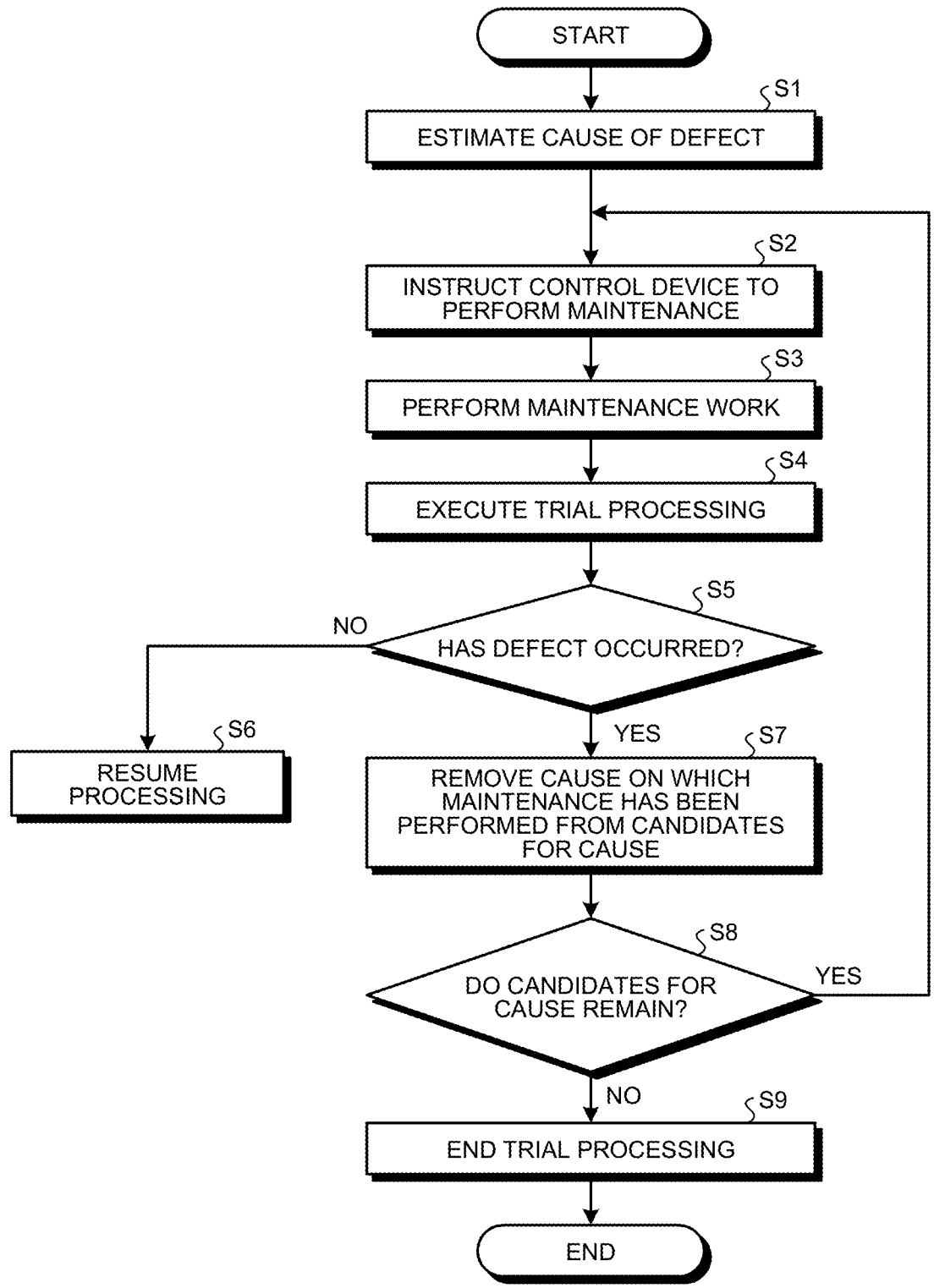
FIG. 4 is a flowchart for explaining maintenance work from estimation of a cause of a defect according to the first embodiment.

FIG. 4 is a flowchart for explaining maintenance work from estimation of a cause of a defect according to the first embodiment.

First, the estimation unit 10 estimates a cause of a defect (step S1). If unable to narrow down the cause of the defect to one, the estimation unit 10 estimates candidates for the cause of the defect including a plurality of causes as described above.

Next, the estimation unit 10 instructs the control device 6 to perform maintenance on the basis of the cause of the defect or candidates for the cause of the defect estimated (step S2). Specifically, when the plurality of candidates for the cause estimated by the estimation unit 10 is acquired, one cause is selected from the plurality of candidates for the cause, and the control device 6 is instructed to perform maintenance work for removing the selected cause. Note that in step S2, an operator may be requested to perform maintenance for removing the selected cause by, for example, causing the display unit of the control device 6 to display the selected cause.

According to the instruction from the estimation unit 10 in step S2, the control device 6 performs maintenance work for removing the selected cause (step S3). Specifically, the control device 6 causes the laser oscillator 2 or the drive unit 5 to perform maintenance work. Note that when the operator is requested to perform maintenance, the operator performs the maintenance work.

After that, the laser processing apparatus 1 executes trial processing (step S4).

The processed state observation unit 8 then determines whether or not a defect has occurred in the trial processing (step S5). If no defect has occurred in the trial processing (No in step S5), the laser processing apparatus 1 resumes normal processing (step S6).

If a defect has occurred in the trial processing (Yes in step S5), the estimation unit 10 removes the cause, on which the control device 6 has performed the maintenance work, from the candidates for the cause of the defect (step S7). Then, the estimation unit 10 determines whether or not the candidates for the cause remain (step S8).

If no candidate for the cause remains (No in step S8), the laser processing apparatus 1 ends the trial processing (step S9).

If the candidates for the cause remain (Yes in step S8), the procedure returns to step S2 so that one cause is selected from the remaining candidates for the cause, and the control device 6 is instructed to perform maintenance work for removing the selected cause. Alternatively, the operator is requested to perform maintenance for removing the selected cause.

Note that when selecting one cause from the plurality of candidates for the cause in step S2, the estimation unit 10 selects the cause in descending order of likelihood or frequency of occurrence thereof from among the plurality of candidates for the cause. In order to remove the cause selected in such a manner, the estimation unit 10 instructs the control device 6 to perform maintenance work or requests the operator to perform maintenance, thereby enabling maintenance work efficiently. Alternatively, in order for the cause of the defect to be able to be removed even in the absence of the operator, the estimation unit 10 may select the cause in order from one on which the laser processing apparatus 1 can automatically perform maintenance work, and instruct the control device 6 to perform maintenance work.

Also, in step S2, in order for the operator to easily understand what kind of defect has occurred in which section, the evaluation information such as the evaluation value and the determination result may be displayed on the display unit of the control device 6, or the evaluation information such as the evaluation value and the determination result corresponding to the section of the processing path displayed on the display unit may be displayed on the section.

Moreover, when the storage unit 9 stores processing conditions for each section, the direction of progress of processing for each section, a result of analysis of the time series signal acquired from the detection unit 7, and the like in addition to the evaluation information for each section, the estimation unit 10 can use these pieces of information stored in the storage unit 9 in addition to the evaluation information at the time of estimating the cause of the defect.

The estimation unit 10 can employ various methods to select two sections including the section with the defect for comparison using the evaluation information such as the evaluation value, and specific examples of the methods of selection including ones already described are as follows.

- A method of selecting two different sections processed under the same processing conditions on the same workpiece 11, in order to confirm that the adjustment of the processing conditions has no problem.
- A method of selecting a section determined to have a defect and a section immediately therebefore, in order to distinguish whether the defect detected has occurred unexpectedly or continuously.
- A method of selecting, as a second section, a section processed on the processing path of another workpiece that has the same material and thickness as the workpiece with the defect, in order to check if the material condition is appropriate.

The methods listed above are examples and do not limit the method of selecting the sections, and the sections to be compared may be selected according to the purpose. Also, different methods of selecting the sections can be used together to estimate the cause of the defect.

When the estimation unit 10 estimates the cause of the defect, the frequency of occurrence of the defect for each cause can be stored in advance and used to estimate the cause of the defect in combination with the evaluation information in which the processed state of the section is classified. Moreover, when a plurality of candidates for the cause of the defect exists, the estimation unit 10 may display all the candidates for the cause estimated on the display unit of the control device 6 or the like, or display the cause in descending order of likelihood or in order from one on which maintenance can be performed automatically, as described above.

Furthermore, in estimating the cause of the defect, the estimation unit 10 can use operation information of the laser processing apparatus 1 before the occurrence of the defect. Specifically, in cutting processing, a hole called a pierce is made in the workpiece 11 before the start of cutting. When the pierce is made, the workpiece 11 is intermittently irradiated with the laser beam at the same position, so that spatter generated by melting the workpiece 11 may be scattered in all directions as compared to the cutting processing. Thus, when the determination result indicates a defect immediately after the piercing, adhesion of the scattered spatter to the nozzle or contamination of the protective glass is highly likely to be the cause of the defect. Therefore, when a defect has occurred in a section immediately after the piercing hole is made, adhesion of the spatter to the nozzle or contamination of the optical system such as the protective glass is highly likely to be the cause of the defect. On the other hand, when the determination result is satisfactory immediately after the piercing, adhesion of the spatter to the nozzle or contamination of the optical system such as the protective glass is considered less likely to be the cause of the defect.

As described above, in the laser processing apparatus 1 according to the first embodiment, the processed state observation unit 8 evaluates the processed state on the basis of the time series signal acquired by the detection unit 7 to obtain the evaluation information, and the storage unit 9 stores the evaluation information. When it is determined that a defect has occurred in processing, the estimation unit 10 estimates a cause of the defect and causes the control device 6 to perform maintenance on a machine of the laser processing apparatus 1 or adjust the processing conditions such that the cause of the defect is eliminated.

When the cause of the defect cannot be estimated, it is necessary to check items of all causes that are possibly the cause of the defect, which results in extra work and requires labor and time until satisfactory processing by the laser processing apparatus 1 can be restored. On the other hand, when a defect has occurred during processing, the laser processing apparatus 1 according to the first embodiment estimates a cause of the defect from the evaluation information on two sections including the section evaluated to have the defect. This can narrow down the cause of the defect and reduce work that requires checking, so that satisfactory processing can be restored more efficiently. That is, maintenance of the laser processing apparatus 1 or adjustment of the processing conditions based on the cause of the defect is performed more easily to be able to quickly restore the processed state to a satisfactory processed state even in the event of the processing defect.

Second Embodiment

In a second embodiment, the estimation unit 10 uses evaluation information such as evaluation values of more than two sections in order to more accurately estimate a cause of a defect. By estimating a cause of a defect from the evaluation information of more than two sections, the cause of the defect can be estimated more accurately than in the first embodiment. Especially with regard to a defect that has a sign but does not occur unexpectedly, a cause of the defect can be further narrowed down on the basis of a transition in the evaluation values of a processed state.

The configuration of the laser processing apparatus 1 according to the second embodiment is the same as that of FIG. 1, but the operation of the estimation unit 10 is different from that of the first embodiment. However, the operation of the configuration other than the estimation unit 10 is the same as that of the first embodiment, whereby the description of the operation of the configuration other than the estimation unit 10 will be omitted here.

The operation of the estimation unit 10 according to the second embodiment will now be described in detail.

The estimation unit 10 estimates a cause of a defect on the basis of evaluation information of three or more sections including a section determined to have the defect in a determination result by the processed state observation unit 8. Specifically, when the processed state observation unit 8 determines that a section has a defect during processing, the estimation unit 10 estimates a cause of the defect from an evaluation value of the section determined to have the defect and evaluation values of two or more other sections stored in the storage unit 9. The two or more other sections are selected from sections processed before the section determined to have the defect. That is, the cause of the defect is estimated on the basis of the evaluation value of each of the three or more sections including the section determined to have the defect. Here, although the evaluation value is used to estimate the cause of the defect, the estimation unit 10 may use another quantity included in the evaluation information as long as the cause of the defect is estimated on the basis of the evaluation information of three or more sections including the section determined to have the defect according to the determination result. The cause of the defect may be estimated by including feature values in the evaluation information and comparing the feature values of three or more sections.

As described in the first embodiment, a defect can be classified into a defect that occurs unexpectedly and a defect that does not occur unexpectedly. The defect that does not occur unexpectedly can be further classified into two categories on the basis of a transition in the evaluation value before the occurrence of the defect. As a result, the cause of the defect can be narrowed down more accurately.

Therefore, the defect is classified into the following three cases on the basis of the transition in the evaluation value before the occurrence of the defect.

Figure 5:
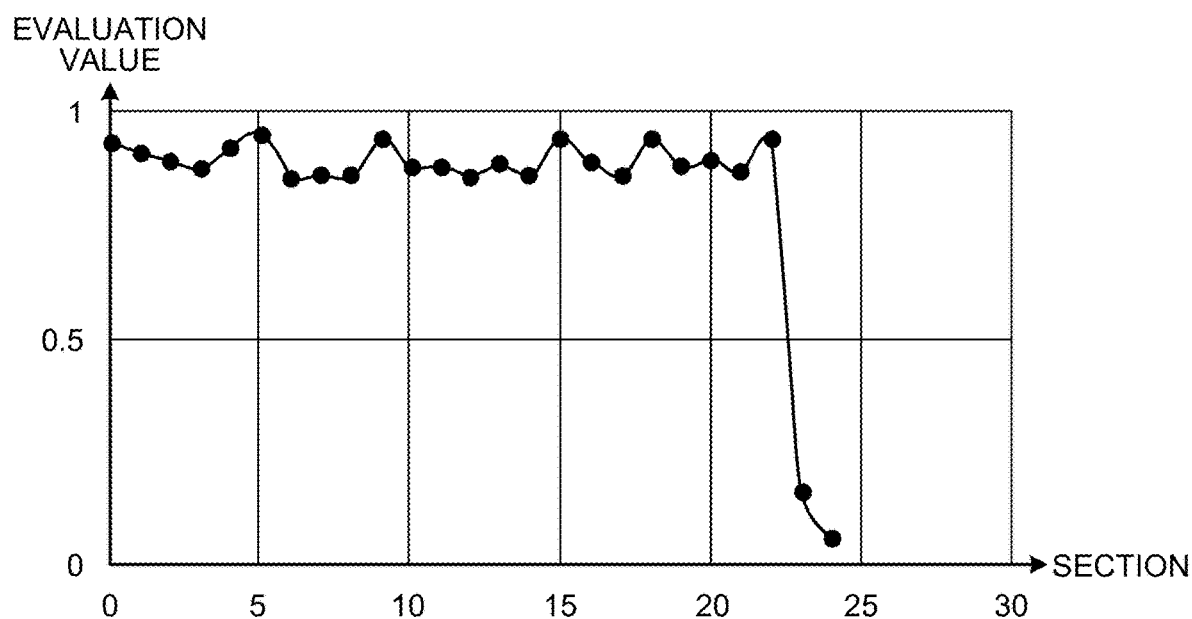
FIG. 5 is a graph illustrating an example of a case where an evaluation value drops abruptly according to a second embodiment of the present invention.
Figure 6:
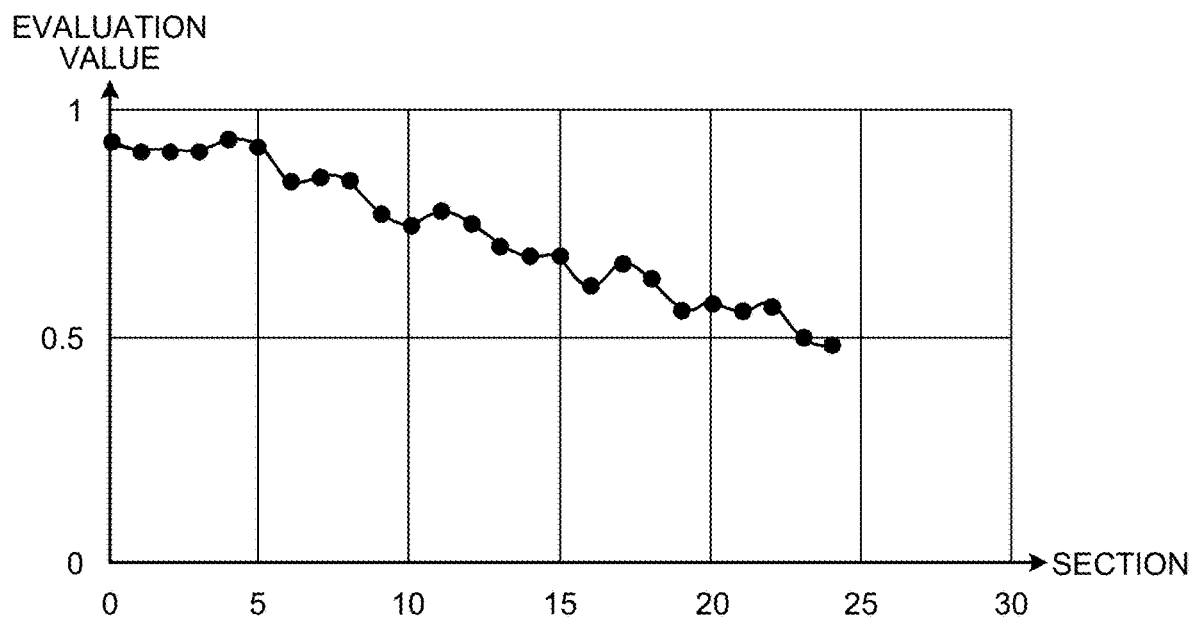
FIG. 6 is a graph illustrating an example of a case where the evaluation value drops gradually according to the second embodiment.
Figure 7:
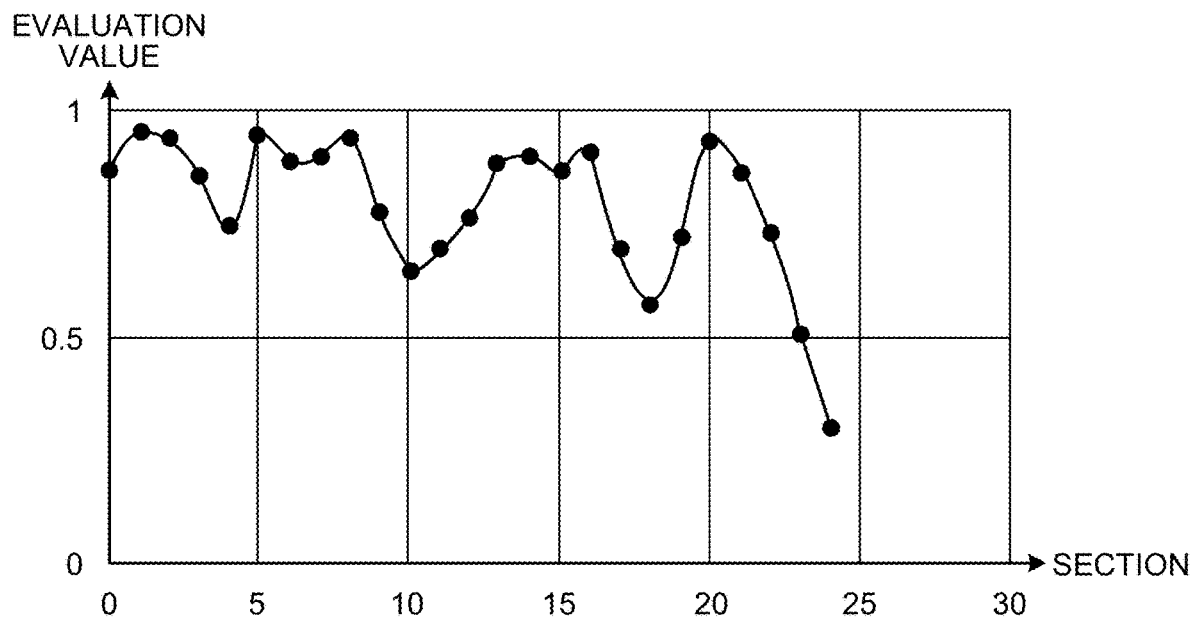
FIG. 7 is a graph illustrating an example of a case where the evaluation value drops while fluctuating according to the second embodiment.

(1) A case where the defect occurs unexpectedly with no sign of the defect
(2) A case where the defect occurs through a gradual decrease in the evaluation value
(3) A case where the defect occurs while the evaluation value changes and undulates from section to section FIGS. 5 to 7 illustrate the change in the evaluation value for each section corresponding to the above three cases. FIG. 5 is a graph illustrating an example of the case where the evaluation value drops abruptly according to the second embodiment of the present invention. FIG. 6 is a graph illustrating an example of the case where the evaluation value drops gradually according to the second embodiment. FIG. 7 is a graph illustrating an example of the case where the evaluation value drops while fluctuating according to the second embodiment. In FIGS. 5 to 7, the horizontal axis represents a numerical value indicating the order of processing of each section for which the evaluation value is obtained by the processed state observation unit 8, and the vertical axis represents the evaluation value obtained for each section.

FIG. 5 illustrates the change in the evaluation value in the case where the defect occurs unexpectedly with no sign of the defect. Although the evaluation value close to "1" indicating a satisfactory processed state is continuously obtained from the first section, the evaluation value unexpectedly changes to a value close to "0" indicating a defect, and the processed state is determined to be defective.

FIG. 6 illustrates the case where the evaluation value drops gradually, the evaluation value being close to "1" indicating a satisfactory processed state in the first section but gradually decreasing to eventually result in the determination that the processed state is defective.

FIG. 7 is an example of the change in the evaluation value in the case where the evaluation value drops while fluctuating greatly from section to section. Although the evaluation value of 0.5 or higher with which the processed state is determined to be satisfactory is maintained until it is eventually determined to be defective, the evaluation value changes while fluctuating and eventually drops to the value of 0.5 or lower, and the processed state is determined to be defective. In the case as illustrated in FIG. 7, whether the evaluation value fluctuates can be determined by, for example, a method that approximates the evaluation values in the sections used for estimating the cause of the defect with a linear function of the numerical values indicating the order of processing of the sections, and sets a threshold for a sum of absolute values of differences between the approximate values and the evaluation values in the sections.

One cause of a defect giving the fluctuation in the evaluation value as in FIG. 6 is the thermal lens effect. The thermal lens effect is a phenomenon in which the focal position shifts with a change in the characteristics of the optical system as the temperature of the optical system rises. Since the temperature of the optical system rises gradually, its influence on the evaluation information such as the evaluation value appears gradually. Therefore, when the thermal lens effect occurs, the evaluation value drops gradually.

One cause of a defect giving the fluctuation in the evaluation value as in FIG. 7 is the high temperature of the workpiece 11. Since the workpiece 11 absorbs energy from the laser during laser processing, the temperature of the workpiece 11 rises gradually. The temperature of the workpiece 11 tends to be the highest near the processing path immediately after processing, and a temperature distribution is formed according to the location. Therefore, depending on the positional relationship between the location where processing has been performed so far and the location where processing is currently being performed, processing may be performed in a region of the workpiece 11 where the temperature is relatively high, or in a region of the workpiece 11 where the temperature is relatively low. As a result, along the processing path of the workpiece 11, the evaluation value changes depending on the section being processed. Therefore, when a defect occurs due to the high temperature of the workpiece 11, the evaluation value of the processed state fluctuates from section to section as in FIG. 7.

Moreover, in the event of the misalignment in which the optical axis of the laser beam deviates from the central axis of the nozzle, the evaluation value changes depending on the direction of progress of processing. This occurs because a flow of the processing gas with respect to a processing point changes depending on the direction in which the optical axis of the laser beam deviates. Therefore, when a defect occurs due to the misalignment, the evaluation value fluctuates greatly depending on the direction of progress of processing, so that the evaluation value may fluctuate as illustrated in FIG. 7. However, one cannot conclude unconditionally that the defect is caused by the misalignment on the basis of whether the evaluation value fluctuates, because the evaluation value may drop abruptly as illustrated in FIG. 5 when the nozzle shifts by coming into contact with a cut edge of the workpiece 11 or the like.

From the above, when a defect has occurred, a cause of the defect can be classified under three cases as follows on the basis of the evaluation value of the section having the defect and the evaluation values of a plurality of sections processed before the section having the defect.

(1) A case where the defect occurs unexpectedly with no sign of the defect
Contamination of optical system such as protective glass
Nozzle damage or deformation
Adhesion of spatter to nozzle
Different surface condition or composition of workpiece 11
Poor adjustment of processing conditions
Misalignment
(2) A case where the defect occurs through a gradual decrease in the evaluation value
Thermal lens effect
(3) A case where the defect occurs while the evaluation value changes and undulates from section to section
High temperature of workpiece 11
Misalignment Candidates for the cause of the defect are determined on the basis of the above classification, and the estimation unit 10 requests the control device 6 or an operator to perform maintenance so as to remove the cause of the defect one by one in the procedure similar to that described with reference to FIG. 4 in the first embodiment.

Also, a database is constructed in advance by collecting patterns of a transition in the evaluation information such as the evaluation values based on changes in the sections in the event of a defect with a known cause, or patterns of a state and a degree of the defect. The estimation unit 10 may then estimate the cause of the defect by performing pattern matching with respect to the database. Furthermore, the estimation unit 10 may create a classifier by performing machine learning using the patterns included in the database as training data, and estimate the cause of the defect by the classifier.

Moreover, when processing is performed in a misaligned state in which the laser beam deviates from the center of the nozzle, the processed state deteriorates during processing in the direction of progress corresponding to the direction of the deviation of the laser beam. Therefore, the estimation unit 10 can estimate whether or not the misalignment has occurred by classifying the processed section according to the direction of progress of processing and evaluating the evaluation value for each direction of progress.

Specifically, on a two-dimensional plane having an X-axis direction and a Y-axis direction, the direction of progress is divided into four directions being a positive X-axis direction, a negative X-axis direction, a positive Y-axis direction, and a negative Y-axis direction. Then, the direction of the misalignment can be estimated by adding up sections that have been processed and evaluation values thereof for each of the four directions, and comparing four values.

For example, when a total value of the evaluation values in the positive X-axis direction is 20% or more lower than a total value of the evaluation values in each of the other directions, that is, the negative X-axis direction, the positive Y-axis direction, and the negative Y-axis direction, it can be estimated that the misalignment has occurred with the laser beam deviating in the positive X-axis direction with respect to the center of the nozzle. When the total values of the evaluation values for the individual directions of progress are balanced among the directions of progress, it can be estimated that the misalignment is not the cause of the defect. As described above, the estimation unit 10 can further narrow down the cause of the defect by using the information on the direction of progress of processing in addition to the evaluation value of the processed section.

As described above, the estimation unit 10 can estimate the cause of the defect on the basis of the direction of progress of processing and the patterns of the transition in the evaluation information, in addition to the processing conditions described in the first embodiment. Moreover, the processing conditions, the direction of progress of processing, and the patterns of the transition in the evaluation information may be combined and used for estimating the cause of the defect.

A plurality of sections used by the estimation unit 10 for comparison with a section determined to have a defect can be selected specifically by the following methods including the method already described.

A method of selecting a plurality of sections immediately before the section determined to have the defect, in order to distinguish whether the defect detected has occurred unexpectedly or has had a sign thereof.

A method of selecting a plurality of sections processed under the same processing conditions as the section determined to have the defect on the same workpiece 11, in order to confirm that the adjustment of the processing conditions has no problem.

A method of selecting a plurality of sections processed on the processing path of another workpiece that has the same material and thickness as the workpiece with the defect, in order to check if the material condition is appropriate.

A method of selecting a plurality of sections processed in the same direction of progress in order to check if there is a difference in the evaluation value depending on the direction of progress of processing.

The methods listed above are examples and do not limit the method of selecting the sections, and the sections to be compared may be selected according to the purpose. Also, different methods of selecting the sections can be used together to estimate the cause of the defect.

Also, when estimating the cause of the defect using the plurality of sections in addition to the section determined to have the defect, the estimation unit 10 may continue normal processing even when the defect has occurred and estimate the cause after acquiring data on fluctuations in the evaluation values.

As described above, the laser processing apparatus 1 according to the second embodiment estimates the cause of the defect on the basis of the evaluation information of three or more sections including the section determined to have the defect, and can thus estimate the cause of the defect more accurately than the first embodiment.

Third Embodiment

A third embodiment describes a method in which the estimation unit 10 estimates a cause of a defect using information acquired from a sensor included in the detection unit 7 in addition to the evaluation value for each processed section used in the first and second embodiments. The configuration other than the detection unit 7 and the estimation unit 10 in the third embodiment is the same as that of FIG. 1 illustrated in the first embodiment, and therefore will not be described.

The detection unit 7 includes a sensor function as follows in addition to the configuration described in the first embodiment. That is, the detection unit 7 further includes at least one of functions such as a temperature sensor for measuring the temperature of the optical system, a camera for observing the surface condition of the workpiece 11, thermography for measuring the surface temperature of the workpiece 11, and a flow sensor for the processing gas. The estimation unit 10 estimates a cause of a defect by using information acquired from these sensors and the like, and can thus estimate the cause with higher accuracy.

When a section is evaluated to have a defect during processing at the time of evaluation by the processed state observation unit 8, the estimation unit 10 estimates a cause of the defect by using the information acquired from the sensor added to the detection unit 7 in addition to evaluation information such as evaluation values of two or more sections including the section determined to have the defect. After that, the estimation unit 10 requests the control device 6 or an operator to perform maintenance so as to remove the cause of the defect one by one in the procedure similar to that described with reference to FIG. 4 in the first embodiment.

The temperature sensor for measuring the temperature of the optical system can be used to determine whether or not the thermal lens effect is occurring. When a defect has occurred during processing, one can determine whether or not the thermal lens effect is occurring by knowing the temperature of the optical system from the information acquired from the temperature sensor that measures the temperature of the optical system.

The camera for observing the surface condition of the workpiece 11 captures an image of the workpiece 11 before processing. An analysis of the image captured enables extraction of the color, metallic luster, or rust condition on the surface of the workpiece 11 in advance for each section on the processing path. Then, when a defect has occurred at the time of processing in one of sections having different surface conditions of the workpiece 11, it can be estimated that the defect is caused by the surface condition of the workpiece 11. Also, if it is recognized that the surface condition of the workpiece 11 is uniform, the surface condition of the material can be excluded from the candidates for the cause of the defect.

Moreover, the thermography can measure the surface temperature of the workpiece 11 during processing. When a region of the workpiece 11 having higher temperature than a set temperature is being processed at the occurrence of a defect during processing, it can be estimated that the defect has occurred due to the high temperature of the workpiece 11. When the temperature of the workpiece 11 is lower than or equal to the set temperature at the occurrence of the defect during processing, the high temperature of the workpiece 11 can be excluded from candidates for the cause of the defect.

The flow sensor for the processing gas measures the flow rate of the gas blown onto the workpiece 11 during processing. A change in the flow rate can be detected when the flow rate of the processing gas changes due to clogging of the nozzle by adhesion of spatter or the like to the nozzle or deformation of a tip of the nozzle. With the change in the flow rate of the processing gas, it can be estimated that clogging of the nozzle or deformation of the nozzle has caused the defect when the flow rate of the processing gas has changed to a value beyond a set value. Also, when the flow rate of the processing gas is within a set range, clogging of the nozzle or deformation of the nozzle can be excluded from the candidates for the cause of the defect.

The combination of the example of the sensor and the cause of the defect described above is an example, and the cause may be estimated by associating the cause of the defect with another sensor. The cause of the defect can thus be narrowed down by using the information other than the evaluation information such as the evaluation value of the processed section.

In the third embodiment, the cause of the defect can be estimated more accurately by combining the information acquired from the additional sensor with the result of estimation of the cause based on the method that compares the evaluation information such as the evaluation value for each section as described in the first and second embodiments.

Figure 8:
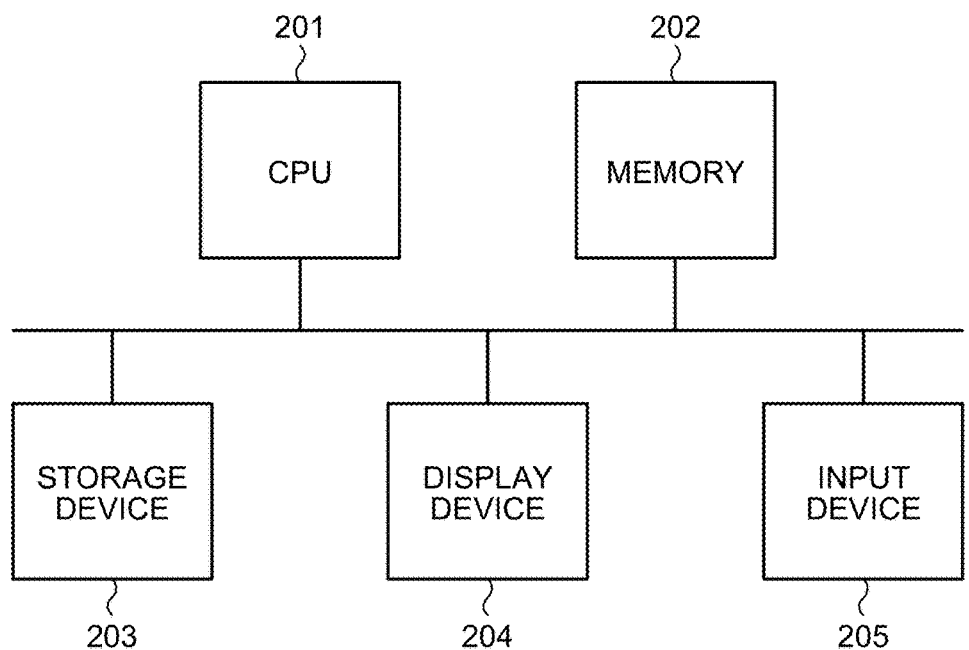
FIG. 8 is a diagram illustrating a hardware configuration in a case where a part of the functions of the laser processing apparatus according to the first to third embodiments is implemented by a computer system.

The functions of the control device 6, the processed state observation unit 8, the storage unit 9, and the estimation unit 10 according to the first to third embodiments are implemented by a computer system such as a personal computer or a general-purpose computer. FIG. 8 is a diagram illustrating a hardware configuration in a case where a part of the functions of the laser processing apparatus 1 according to the first to third embodiments is implemented by the computer system. When the functions of the control device 6, the processed state observation unit 8, the storage unit 9, and the estimation unit 10 of the laser processing apparatus 1 are implemented by the computer system, the functions of the control device 6, the processed state observation unit 8, the storage unit 9, and the estimation unit 10 are implemented by a central processing unit (CPU) 201, a memory 202, a storage device 203, a display device 204, and an input device 205 as illustrated in FIG. 8. The functions executed by the control device 6, the processed state observation unit 8, and the estimation unit 10 are implemented by software, firmware, or a combination of software and firmware. The software or firmware is described as programs and stored in the storage device 203. The CPU 201 implements the functions of the control device 6, the processed state observation unit 8, and the estimation unit 10 by reading the software or firmware stored in the storage device 203 into the memory 202 and executing the software or firmware. That is, the computer system includes the storage device 203 for storing the programs that result in the execution of steps performing the operations of the control device 6, the processed state observation unit 8, and the estimation unit 10 described in the first to third embodiments when the functions of the control device 6, the processed state observation unit 8, and the estimation unit 10 are executed by the CPU 201. It can also be said that these programs cause a computer to execute processing implemented by the functions of the control device 6, the processed state observation unit 8, and the estimation unit 10. The storage unit 9 is implemented by the memory 202 or the storage device 203. The memory 202 corresponds to a volatile storage area such as a random access memory (RAM). The storage device 203 corresponds to a non-volatile or volatile semiconductor memory such as a read only memory (ROM) or a flash memory, or a magnetic disk. The display unit of the control device 6 is implemented by the display device 204. Specific examples of the display device 204 include a monitor and a display. Specific examples of the input device 205 include a keyboard, a mouse, and a touch panel.

The configuration illustrated in the above embodiment merely illustrates an example of the content of the present invention, and can thus be combined with another known technique or partially omitted and/or modified without departing from the scope of the present invention.

REFERENCE SIGNS LIST 1 laser processing apparatus; 2 laser oscillator; 3 optical path; 4 processing head; 5 drive unit; 6 control device; 7 detection unit; 8 processed state observation unit; 9 storage unit; 10 estimation unit; 11 workpiece; 11a processing path; 201 CPU 202 memory; 203 storage device; 204 display device; 205 input device.

The invention claimed is:

1. A laser processing apparatus comprising:
a laser oscillator to emit a laser beam;
a processing head including an optical system that focuses the laser beam onto a workpiece;
a driver to control a relative positional relationship between the workpiece and the processing head;
a control circuitry to control the laser oscillator and the driver in order for the laser beam to scan a processing path on the workpiece according to a set processing condition;
a detection circuitry to observe a state of the workpiece being processed and output a result of observation as a time series signal;
a processed state observation circuitry to obtain evaluation information including a determination result that indicates whether a processed state of the workpiece is satisfactory or defective by evaluating the processed state of the workpiece on the basis of the time series signal for each of a plurality of sections obtained by dividing the processing path; and
an estimation circuitry to estimate a cause of a defect on the basis of the evaluation information of two or more of the sections including the section for which the determination result indicates the defect, wherein a first of the two or more sections is a section of the observed processing path that is determined to have a defect and a second of the two or more sections is another section of the observed processing path stored in a memory, wherein the first and second of the two or more sections are adjacent.

2. The laser processing apparatus according to claim 1, wherein
the evaluation information includes an evaluation value that evaluates the processed state of the workpiece, and
the estimation circuitry estimates the cause of the defect on the basis of the evaluation value.

3. The laser processing apparatus according to claim 1, wherein
the estimation circuitry estimates the cause of the defect also on the basis of at least one of a direction of progress of processing, a pattern of a transition of the evaluation information, and the processing condition.

4. The laser processing apparatus according to claim 1, wherein
the control circuitry performs maintenance work that removes the cause of the defect estimated by the estimation circuitry.

5. The laser processing apparatus according to claim 1, wherein
the estimation circuitry estimates the cause of the defect on the basis of the evaluation information of two or more of the sections including the section that is processed under the processing condition being the same.

6. The laser processing apparatus according to claim 1, wherein
the evaluation information includes classification information that indicates a classification of a defective state of the workpiece.

7. The laser processing apparatus according to claim 6, wherein
the classification information includes a value corresponding to at least one of dross, a flaw, upper surface roughness, lower surface roughness, oxide film peeling, and burning.

8. The laser processing apparatus according to claim 1, further comprising
 a monitor to display the evaluation information obtained by the processed state observation circuitry or the cause of the defect estimated by the estimation circuitry.

\* \* \* \* \*